United States Patent
Finter et al.

(10) Patent No.: US 8,062,468 B2
(45) Date of Patent: Nov. 22, 2011

(54) LOW-TEMPERATURE IMPACT RESISTANT THERMOSETTING EPOXIDE RESIN COMPOSITIONS WITH SOLID EPOXIDE RESINS

(75) Inventors: Jürgen Finter, Zürich (CH); Andreas Kramer, Zürich (CH); Jan Olaf Schulenburg, Zürich (CH); Urs Rheinegger, Zürich (CH)

(73) Assignee: Sika Technology AG, Baar (CH)

( * ) Notice: Subject to any disclaimer, the term of this patent is extended or adjusted under 35 U.S.C. 154(b) by 332 days.

(21) Appl. No.: 11/988,290

(22) PCT Filed: Jul. 5, 2006

(86) PCT No.: PCT/EP2006/063891
§ 371 (c)(1),
(2), (4) Date: Jun. 22, 2009

(87) PCT Pub. No.: WO2007/003650
PCT Pub. Date: Jan. 11, 2007

(65) Prior Publication Data
US 2010/0116433 A1 May 13, 2010

(30) Foreign Application Priority Data
Jul. 5, 2005 (EP) .................................. 05106097

(51) Int. Cl.
C09J 163/02 (2006.01)
C08L 63/00 (2006.01)
C08L 75/04 (2006.01)
B32B 27/38 (2006.01)

(52) U.S. Cl. ........ 156/330; 525/523; 525/524; 525/525; 525/526; 525/528; 428/414

(58) Field of Classification Search .................. 428/523, 428/524, 525, 526, 528; 525/413, 414, 416, 525/418; 156/330
See application file for complete search history.

(56) References Cited

U.S. PATENT DOCUMENTS

| 3,148,167 A | 9/1964 | Keplinger, Jr. |
| 3,505,283 A | 4/1970 | Dalhuisen |
| 3,533,983 A | 10/1970 | Hirosawa |
| 4,383,068 A | 5/1983 | Brandt |
| 4,486,556 A | 12/1984 | Kordomenos et al. |
| 4,952,645 A | 8/1990 | Mulhaupt et al. |
| 5,073,601 A | 12/1991 | Mülhaupt et al. |
| 5,079,094 A | 1/1992 | Kimball |
| 5,151,327 A | 9/1992 | Nishiyama et al. |
| 5,189,081 A | 2/1993 | Akutagawa et al. |
| 5,274,006 A | 12/1993 | Kagoshima et al. |
| 5,278,257 A | 1/1994 | Mulhaupt et al. |
| 5,290,857 A | 3/1994 | Ashida et al. |
| 5,350,825 A | 9/1994 | Konig et al. |
| 5,484,853 A | 1/1996 | Chen et al. |
| 5,668,227 A | 9/1997 | Wolleb et al. |
| 5,686,509 A | 11/1997 | Nakayama et al. |
| 5,707,439 A | 1/1998 | Takekoshi et al. |
| 5,908,911 A | 6/1999 | Nakashio et al. |
| 6,077,884 A | 6/2000 | Hess et al. |
| 6,153,709 A | 11/2000 | Xiao et al. |
| 6,197,849 B1 | 3/2001 | Zilg et al. |
| 6,207,733 B1 | 3/2001 | Feola et al. |
| 6,248,204 B1 | 6/2001 | Schuft |
| 6,322,890 B1 | 11/2001 | Barron et al. |
| 6,548,593 B2 | 4/2003 | Merz et al. |
| 6,649,706 B1 | 11/2003 | Heid et al. |
| 6,723,803 B1 | 4/2004 | Hermansen et al. |
| 6,740,192 B1 | 5/2004 | Lu et al. |
| 6,903,182 B2 | 6/2005 | Fagan et al. |
| 2002/0007003 A1 | 1/2002 | Merz et al. |
| 2002/0061970 A1 | 5/2002 | Sawada |
| 2003/0105266 A1 | 6/2003 | Suga |
| 2005/0209401 A1* | 9/2005 | Lutz et al. .................. 525/113 |
| 2007/0066721 A1 | 3/2007 | Kramer et al. |
| 2007/0105983 A1 | 5/2007 | Kramer et al. |
| 2008/0073029 A1 | 3/2008 | Kramer et al. |
| 2009/0264558 A1 | 10/2009 | Kramer et al. |
| 2009/0288766 A1* | 11/2009 | Kramer et al. ............. 156/275.5 |

FOREIGN PATENT DOCUMENTS

| DE | 197 51 143 A | 5/1998 |
| DE | 198 58 921 A1 | 6/2000 |
| DE | 199 24 170 A1 | 11/2000 |
| EP | 0 307 666 A1 | 3/1989 |
| EP | 0 338 985 B1 | 10/1989 |
| EP | 0 338 995 | 10/1989 |
| EP | 0 343 676 A1 | 11/1989 |
| EP | 0 343 686 A1 | 11/1989 |
| EP | 0 353 190 | 1/1990 |
| EP | 0 600 314 A1 | 6/1994 |
| EP | 0 781 790 A1 | 7/1997 |
| EP | 1 152 019 A1 | 11/2001 |
| EP | 1 359 202 A1 | 11/2003 |

(Continued)

OTHER PUBLICATIONS

Non-Final Rejection of U.S. Appl. No. 10/564,889, mailed Apr. 14, 2010.
Non-Final Rejection in U.S. Appl. No. 12/311,046 mailed Nov. 2, 2009.
International Search Report for International Application No. PCT/EP2007/056598 mailed Aug. 29, 2007.
Derwent accession No. 2001-062546 for German Patent No. 19,924,170 and U.S. Patent No. 6,649,706, Heid et al., Nov. 30, 2000, one page.
Derwent accession No. 2002-124066 for European Patent No. 1/152,019 and U.S. Patent No. 6,548,593, Merz et al., Nov. 7, 2001, one page.

(Continued)

Primary Examiner — Michael J Feely
(74) Attorney, Agent, or Firm — Oliff & Berridge, PLC

(57) ABSTRACT

The invention relates to compositions containing at least one solid epoxide resin A, at least one polymer B of formula (1), at least one thixotropic agent C made from a urea derivative and at least one curing agent for epoxide resins D activated by high temperatures. The compositions are particularly suitable for use as adhesives. Low-temperature impact-resistant adhesives can be produced for use in particular as structural adhesives.

29 Claims, No Drawings

FOREIGN PATENT DOCUMENTS

| | | |
|---|---|---|
| EP | 1 431 325 A1 | 6/2004 |
| EP | 1 498 441 A1 | 1/2005 |
| GB | 1 326 669 | 8/1973 |
| GB | 2 314 085 A | 12/1997 |
| JP | 2000-212504 A | 8/2000 |
| WO | WO 00/37520 A1 | 6/2000 |
| WO | WO 00/37554 A1 | 6/2000 |
| WO | WO 01/23466 A1 | 4/2001 |
| WO | WO 02/48235 | 6/2002 |
| WO | WO 03/093387 A1 | 11/2003 |
| WO | WO 2004/055092 A1 | 7/2004 |
| WO | WO 2005/007720 | 1/2005 |
| WO | WO 2005/007766 A1 | 1/2005 |

OTHER PUBLICATIONS

Non-Final Rejection in U.S. Appl. No. 11/976,991 mailed Nov. 3, 2009.

International Search Report for International Application No. PCT/EP/03/14382 mailed Apr. 7, 2004.

Non-Final Rejection in U.S. Appl. No. 10/538,877 mailed Nov. 18, 2009.

Non-Final Rejection in U.S. Appl. No. 10/564,889 mailed Feb. 2, 2009.

Final Rejection in U.S. Appl. No. 10/564,889 mailed Sep. 25, 2009.

International Search Report for International Application No. PCT/EP2007/061416 mailed Feb. 6, 2008.

Non-Final Rejection in U.S. Appl. No. 10/564,889, mailed Sep. 21, 2010.

Office Action from U.S. Appl. No. 10/564,889, mailed Feb. 8, 2011.

Notice of Allowance in U.S. Appl. No. 10/564,889 mailed Aug. 10, 2011.

\* cited by examiner

LOW-TEMPERATURE IMPACT RESISTANT THERMOSETTING EPOXIDE RESIN COMPOSITIONS WITH SOLID EPOXIDE RESINS

FIELD OF THE INVENTION

The invention relates to thermosetting compositions which at low temperatures feature both a high impact strength and good mechanical properties.

BACKGROUND ART

In the manufacture both of vehicles and exterior mounted components or else machinery and equipment, instead of or in combination with conventional joining techniques such as screwing, riveting, punching or welding, the use of high-grade adhesives is becoming ever more frequent. When structural parts are adhesively bonded, high strength and impact resistance on the part of the adhesive are of the utmost importance.

Conventional epoxy adhesives are indeed distinguished by a high mechanical strength, more particularly a high tensile strength. When the adhesive bond is subject to shock-like stress, however, typical epoxy adhesives are usually too brittle and under crash conditions, where there are great tensile stresses and also great peel stresses, they may fall well below the requirements, more particularly those of the automobile industry. Often unsatisfactory in this respect, in particular, are the strengths at high temperatures but more particularly those at low temperatures as well, below −10° C.

Consequently, a variety of methods has been employed with the aim of improving the impact resistance of thermosetting epoxy adhesives.

EP-A-1 359 202 describes an improvement to impact resistance through the use of a urea derivative in a nondiffusing carrier material, and also impact-resistant compositions which comprise said urea derivative and also epoxide adducts. EP-A-1 431 325 describes the use of an epoxide-group-terminated impact-modified polymer and also impact-resistant compositions which comprise said impact-modified polymer and also epoxide adducts. EP-A-1 498 441 likewise describes a further epoxide-group-terminated impact-modified polymer and also impact-resistant compositions which comprise said impact-modified polymer and also epoxide adducts. Through the use of the epoxide-group-terminated impact-modifier polymers it has indeed been possible to achieve a marked increase in the impact resistance at low temperatures; however, all of the impact-resistant compositions disclosed in these documents contained an epoxide adduct. Such epoxide adducts require separate preparation and tend to have a relatively high viscosity.

DISCLOSURE OF THE INVENTION

It is an object of the present invention, therefore, to provide heat-curable impact-resistant epoxy resin compositions which on the one hand enjoy both a high low-temperature impact resistance and a high mechanical strength and on the other hand are easy to prepare.

Surprisingly, it has proven the case that this object has been achieved by compositions according to claim 1.

Compositions of this kind have a high impact resistance at low temperatures, more particularly at temperatures of below −20° C.

More particularly it has emerged that these properties can be achieved without epoxide adducts and are distinguished by a simplified preparation process. It has in fact emerged, surprisingly, that through the use of solid resins it is likewise possible to achieve high impact strengths.

Adhesives of this kind can achieve high impact strengths, measured as fracture energy, of more than 13 J at 23° C. and of more than 5 J at −40° C. Furthermore, it is possible to reduce the typical large differences between low temperature and standard temperature in impact strength. Thus with the compositions it is possible to achieve ratios of fracture energy at −40° C. to 23° C. of above 40%, sometimes even above 80%.

Additionally it has been found that these compositions are of excellent suitability as adhesives, more particularly as bodyshell adhesives, and can be employed across a broad temperature range.

EMBODIMENTS OF THE INVENTION

The present invention relates to compositions which comprise at least one solid epoxy resin A, at least one polymer B of the formula (I), at least one thixotropic agent C, based on a urea derivative and at least one curative D for epoxy resins which is activated by elevated temperature.

The term "solid epoxy resin" is very well known to the skilled epoxide worker and is used in opposition to "liquid epoxy resins". The glass transition temperature of solid resins is above room temperature; in other words, they can be comminuted into free-flowing powders at room temperature.

Preferred solid epoxy resins A have the formula (II)

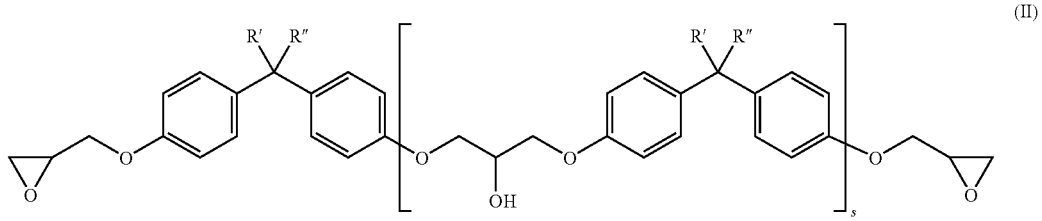

In this formula the substituents R' and R" independently of one another are either H or CH$_3$. Furthermore, the index s is a value>1.5, more particularly of 2 to 12.

Solid epoxy resins of this kind are available commercially, for example, from Dow or Huntsman or Resolution.

Preferably, the total fraction of the solid epoxy resin A is 1%-40%, more particularly 5%-40%, preferably 5%-30%, most preferably 5%-20%, by weight, based on the weight of the overall composition.

The composition further comprises at least one polymer B of the formula (I)

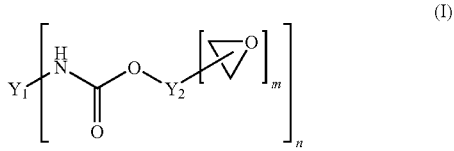
(I)

In this formula $Y_1$ is an n-valent radical of a linear or branched polyurethane prepolymer PU1, terminated with isocyanate groups, following the removal of the terminal isocyanate groups. $Y_2$ is a radical of an aliphatic, cycloaliphatic, aromatic or araliphatic epoxide containing a primary or secondary hydroxyl group, following the removal of the hydroxide and epoxide groups. Additionally, the index m is the values 1, 2 or 3 and the index n is the values 2 to 8.

The polymer B of the formula (I) is obtainable, for example, through the reaction of a monohydroxyl epoxide compound of the formula (IV) and of an isocyanate-group-terminated linear or branched polyurethane prepolymer PU1 of the formula (V):

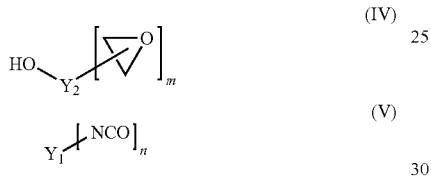

This polyurethane prepolymer PU1 is prepared from at least one diisocyanate or triisocyanate and also from a polymer $Q_{PM}$ having terminal amino, thiol or hydroxyl groups and/or from an optionally substituted polyphenol $Q_{PP}$.

Throughout the present specification the prefix "poly" in "polyisocyanate", "polyol", "polyphenol" and "polymercaptan" designates molecules which formally contain two or more of the respective functional groups.

Suitable diisocyanates are aliphatic, cycloaliphatic, aromatic or araliphatic diisocyanates, more particularly commercially customary products such as methylenediphenyl diisocyanate (MDI), hexamethylene diisocyanate (HDI), toluene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), etc. and also their dimers. Preference is given to HDI, IPDI, MDI or TDI.

Suitable triisocyanates are trimers or biurets of aliphatic, cycloaliphatic, aromatic or araliphatic diisocyanates, more particularly the isocyanurates and biurets of the diisocyanates described in the preceding paragraph.

Most particular suitability as polymers $Q_{PM}$ having terminal amino, thiol or hydroxyl groups is possessed by polymers $Q_{PM}$ having two or three terminal amino, thiol or hydroxyl groups.

The polymers $Q_{PM}$ advantageously have an equivalent weight of 600-6000, more particularly of 600-4000, preferably of 700-2200 g/equivalent of NCO reactive groups.

Suitability as polymers $Q_{PM}$ is possessed by polyols, examples being the following commercially customary polyols or any desired mixtures thereof:

polyoxyalkylene polyols, also called polyether polyols, which are the polymerization product of ethylene oxide, 1,2-propylene oxide, 1,2- or 2,3-butylene oxide, tetrahydrofuran or mixtures thereof, optionally polymerized by means of a starter molecule having two or three active H atoms such as water, for example, or compounds having two or three OH groups. Use may be made both of polyoxyalkylene polyols which have a low degree of unsaturation (measured by ASTM D-2849-69 and reported in milliequivalents of unsaturation per gram of polyol (mEq/g)), prepared for example with the aid of what are called double metal cyanide complex catalysts (DMC catalysts for short), and of polyoxyalkylene polyols having a higher degree of unsaturation, prepared for example by means of anionic catalysts such as NaOH, KOH or alkali metal alkoxides. Of especial suitability are polyoxypropylene diols and triols having a degree of unsaturation of less than 0.02 mEq/g and having a molecular weight in the range of 1000-30 000 daltons, polyoxybutylene diols and triols, polyoxypropylene diols and triols having a molecular weight of 400-8000 daltons, and also "EO-endcapped" (ethylene oxide-endcapped) polyoxypropylene diols or triols. The latter are specific polyoxypropylene-polyoxyethylene polyols which are obtained, for example, by alcoxylating pure polyoxypropylene polyols with ethylene oxide when the polypropoxylation is finished, and which as a result contain primary hydroxyl groups.

polyhydroxy-terminated polybutadiene polyols, such as those, for example, prepared by polymerization of 1,3-butadiene and allyl alcohol, and also their hydrogenation products;

styrene-acrylonitrile grafted polyether polyols, of the kind supplied, for example, by Elastogran under the name Lupranol®;

polyhydroxy-terminated acrylonitrile/polybutadiene copolymers, of the kind preparable, for example, from carboxyl-terminated acrylonitrile/polybutadiene copolymers (available commercially under the name Hycar® CTBN from Hanse Chemie AG, Germany) and epoxides or from amino alcohols;

polyester polyols, prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-tri-methylolpropane or mixtures of the aforementioned alcohols, with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, and also polyester polyols from lactones such as ε-caprolactone, for example;

polycarbonate polyols, of the kind obtainable through reaction, for example, of the abovementioned alcohols—those used for synthesizing the polyester polyols—with dialkyl carbonates, diaryl carbonates or phosgene.

Advantageous polymers $Q_{PM}$ are those of polyols with a functionality of two or more which have OH equivalent weights of 600 to 6000 g/OH equivalent, more particularly of 600 to 4000 g/OH equivalent, preferably 700-2200 g/OH equivalent. Also advantageous are the polyols selected from the group consisting of polyethylene glycols, polypropylene glycols, polyethylene glycol-polypropylene glycol block copolymers, polybutylene glycols, hydroxyl-terminated polybutadienes, hydroxyl-terminated polybutadiene-coacrylonitriles, hydroxyl-terminated synthetic rubbers, their hydrogenation products and mixtures of these stated polyols.

It is also possible, furthermore, as polymers $Q_{PM}$, to use difunctional or higher-functional amino-terminated polyethylene ethers, polypropylene ethers, polybutylene ethers, polybutadienes, polybutadiene/acrylonitriles, of the kind sold, for example, under the name Hycar® CTBN from Hanse Chemie AG, Germany, and also further amino-terminated synthetic rubbers or mixtures of the stated components.

For certain applications, suitable polymers $Q_{PM}$ include more particularly hydroxyl-containing polybutadienes or polyisoprenes or their hydrogenated reaction products.

It is additionally possible for the polymers $Q_{PM}$ also to have been chain-extended in the way which can be carried out, in a manner known to the skilled worker, through the reaction of polyamines, polyols, and polyisocyanates, more particularly of diamines, diols, and diisocyanates.

Taking the example of a diisocyanate and a diol, and depending on the chosen stoichiometry, the product of said reaction, as shown below, is a species of the formula (VI) or (VII)

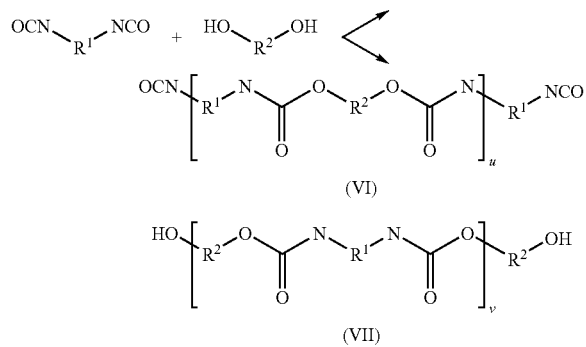

The radicals $R^1$ and $R^2$ are a divalent organic radical and the indices v and w vary, depending on stoichiometric ratio, from 1 to typically 5.

These species of the formula (VI) or (VII) can then in turn be reacted further. Thus, for example, from the species of the formula (VI) and a diol having a divalent organic radical $R^3$ it is possible to form a chain-extended polyurethane prepolymer PU1 of the following formula

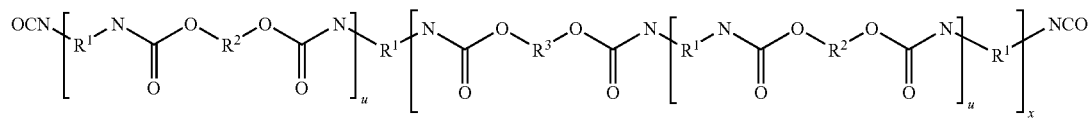

From the species of the formula (VII) and a diisocyanate having a divalent organic radical $R^4$ it is possible to form a chain-extended polyurethane prepolymer PU1 of the following formula:

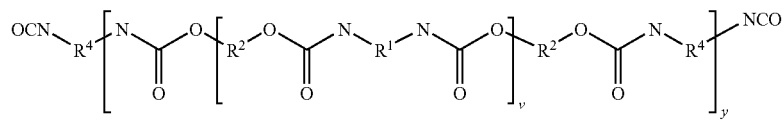

The indices x and y vary, depending on stoichiometric ratio, from 1 to typically 5, and more particularly are 1 or 2.

Furthermore, the species of the formula (VI) can also be reacted with the species of the formula (VII), giving a chain-extended polyurethane prepolymer PU1 containing NCO groups.

For the chain extension more particular preference is given to diols and/or diamines and diisocyanates. It is of course clear to the skilled worker that polyols of higher functionality, such as trimethylolpropane or pentaerythritol, or polyisocyanates of higher functionality, such as isocyanurates of diisocyanates, can also be used for the chain extension.

In the case of the polyurethane prepolymers PU1 generally, and in the case of the chain-extended polyurethane prepolymers specifically, it should advantageously be ensured that the prepolymers do not have excessively high viscosities, particularly if compounds of relatively high functionality are used for the chain extension, since high viscosities may hamper their reaction to form the polymers of the formula B and/or may hamper the application of the composition.

Preferred polymers $Q_{PM}$ are polyols having molecular weights between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated polybutadiene-acrylonitrile copolymers and mixtures thereof.

Particularly preferred polymers $Q_{PM}$ are $\alpha,\omega$-polyalkylene glycols having $C_2$-$C_6$ alkylene groups or having mixed $C_2$-$C_6$ alkylene groups and terminated with amino groups, thiol groups or preferably, hydroxyl groups. Particularly preferred are polypropylene glycols, or polybutylene glycols. Additionally particularly preferred are hydroxyl-group-terminated polyoxybutylenes.

Particularly suitable as polyphenol $Q_{PP}$ are bis-, tris-, and tetraphenols. By these are meant not only pure phenols but also, where appropriate, substituted phenols. The nature of the substitution may be very diverse. The reference here is more particularly to substitution directly on the aromatic nucleus to which the phenolic OH group is attached. By phenols are meant, furthermore, not only mononuclear aromatics, but also polynuclear or fused aromatics or heteroaromatics which contain the phenolic OH group directly on the aromatic or heteroaromatic moiety, respectively.

The nature and position of such a substituent exerts an influence on—among other things—the reaction with isocyanates that is necessary for the formation of the polyurethane prepolymer PU1.

Particularly suitable are the bis- and trisphenols. Examples of suitable bisphenols or trisphenols include 1,4-dihydroxybenzene, 1,3-dihydroxybenzene, 1,2-dihydroxybenzene, 1,3-dihydroxytoluene, 3,5-dihydroxy-benzoates, 2,2-bis(4-hydroxy-phenyl)propane(=bisphenol A), bis(4-hydroxyphenyl)methane(=bisphenol F), bis(4-hydroxyphenyl)sulfone(=bisphenol S), naphthoresorcinol, dihydroxynaphthalene, dihydroxyanthraquinone, dihydroxybiphenyl, 3,3-bis(p-hydroxyphenyl)phthalides, 5,5-bis(4-hydroxyphenyl)hexahydro-4,7-methanoindane, phenolphthalein, fluoroscein, 4,4'-[bis(hydroxyphenyl)-1,3-phenylenebis(1-methylethylidene)] (=bisphenol M), 4,4'-[bis(hydroxyphenyl)-1,4-phenylenebis(1-methylethylidene)] (=bisphenol P), o,o-diallylbisphenol A, diphenols and dicresols prepared by reacting phenols or cresols with diisopropylidenebenzene, phloroglucinol, gallic esters, phenol or cresol novolaks with OH functionality of 2.0 to 3.5 and also all isomers of the aforementioned compounds.

Preferred diphenols and dicresols prepared by reacting phenols or cresols with diisopropylidenebenzene have a chemical structural formula of the kind shown below, correspondingly for cresol as an example:

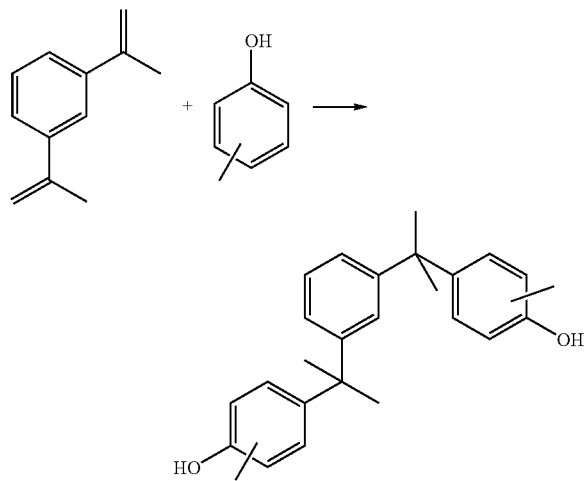

Particular preference is given to bisphenols of low volatility. The most preferred are bisphenol M and bisphenol S.

Preferably the $Q_{PP}$ contains 2 or 3 phenolic groups.

In a first embodiment the polyurethane prepolymer PU1 is prepared from at least one diisocyanate or triisocyanate and also from a polymer $Q_{PM}$ having terminal amino, thiol or hydroxyl groups. The polyurethane prepolymer PU1 is prepared in a manner known to the skilled polyurethane worker, more particularly by using the diisocyanate or triisocyanate in a stoichiometric excess in relation to the amino, thiol or hydroxyl groups of the polymer $Q_{PM}$.

In a second embodiment the polyurethane prepolymer PU1 is prepared from at least one diisocyanate or triisocyanate and also from an optionally substituted polyphenol $Q_{PP}$. The polyurethane prepolymer PU1 is prepared in a manner known to the skilled polyurethane worker, more particularly by using the diisocyanate or triisocyanate in a stoichiometric excess in relation to the phenolic groups of the polyphenol $Q_{PP}$.

In a third embodiment the polyurethane prepolymer PU1 is prepared from at least one diisocyanate or triisocyanate and also from a polymer $Q_{PM}$ having terminal amino, thiol or hydroxyl groups and also from an optionally substituted polyphenol $Q_{PP}$. For the preparation of the polyurethane prepolymer PU1 from at least one diisocyanate or triisocyanate and also from a polymer $Q_{PM}$ having terminal amino, thiol or hydroxyl groups and/or from an optionally substituted polyphenol $Q_{PP}$ there are various possibilities available.

In a first process, called "one-pot process", a mixture of at least one polyphenol $Q_{PP}$ and at least one polymer $Q_{PM}$ is reacted with at least one diisocyanate or triisocyanate in an isocyanate excess.

In a second process, called "2-step process I", at least one polyphenol $Q_{PP}$ is reacted with at least one diisocyanate or triisocyanate in an isocyanate excess and then with at least one polymer $Q_{PM}$ in a substoichiometric amount.

In the third process finally, called "2-step process II", at least one polymer $Q_{PM}$ is reacted with at least one diisocyanate or triisocyanate in an isocyanate excess and then with at least one polyphenol $Q_{PP}$ in a substoichiometric amount.

The three processes lead to isocyanate-terminated polyurethane prepolymers PU1 which, while having the same composition, may differ in the sequence of their constituent units. All three processes are suitable, but the "two-step process II" is preferred.

Where the above-described isocyanate-terminal polyurethane prepolymers PU1 are synthesized from difunctional components, it has been found that the polymer $Q_{PM}$/polyphenol $Q_{PP}$ equivalent ratio is preferably greater than 1.50 and the polyisocyanate/(polyphenol $Q_{PP}$+polymer $Q_{PM}$) equivalent ratio is preferably greater than 1.20.

Where the average functionality of the components used is greater than 2, the increase in molecular weight is more rapid than in the purely difunctional case. For the skilled worker it is clear that the limits on the possible equivalent ratios depend greatly on whether the chosen polymer $Q_{PM}$, the polyphenol $Q_{PP}$, the diisocyanate or triisocyanate, or two or more of the stated components possess a functionality >2. Accordingly it is possible to set different equivalent ratios, whose limits are determined by the viscosity of the resulting polymers and which must be determined experimentally from one case to the next.

The polyurethane prepolymer PU1 is preferably elastic in character and displays a glass transition temperature Tg of less than 0° C.

The monohydroxyl epoxide compound in formula (IV) has 1, 2 or 3 epoxide groups. The hydroxyl group of this monohydroxyl epoxide compound (IV) may be a primary or a secondary hydroxyl group.

Monohydroxyl epoxide compounds of this kind can be produced, for example, by reacting polyols with epichlorohydrin. Depending on the reaction regime, the reaction of polyfunctional alcohols with epichlorohydrin also gives rise, as by-products, to the corresponding monohydroxyl epoxide compounds in different concentrations. These compounds can be isolated by means of typical separating operations. Generally speaking, however, it is sufficient to use the product mixture obtained in the glycidylization reaction of polyols, composed of polyol having undergone complete and partial reaction to the glycidyl ether. Examples of such hydroxyl-containing epoxides are trimethylolpropane diglycidyl ether (present as a mixture in trimethylolpropane triglycidyl ether), glycerol diglycidyl ether (present as a mixture in glycerol triglycidyl ether), pentaerythritol triglycidyl ether (present as a mixture in pentaerythritol tetraglycidyl ether). Preference is given to using trimethylol propane diglycidyl ether, which occurs in a relatively high fraction in conventionally prepared trimethylol propane triglycidyl ether.

It is also possible, however, to use other similar hydroxyl-containing epoxides, more particularly glycidol, 3-glycidyloxybenzyl alcohol or hydroxy-methylcyclohexene oxide.

Preference is given additionally to the β-hydroxy ether of the formula (VIII), which is present to an extent of about 15% in commercially customary liquid epoxy resins prepared from bisphenol A (R=CH$_3$) and epichlorohydrin, and also to the corresponding β-hydroxy ethers of the formula (VIII), which are formed in the reaction of bisphenol F (R=H) or of the mixture of bisphenol A and bisphenol F with epichlorohydrin.

cyanate with one or more aliphatic amine compounds or to react one monomeric diisocyanate with two or more aliphatic amine compounds. The reaction product of 4,4'-diphenylmethylene diisocyanate (MDI) with butylamine has proven particularly advantageous.

The urea derivative is preferably present in a carrier material. The carrier material may be a plasticizer, more particu-

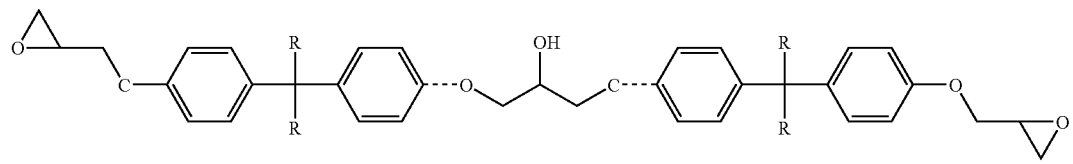

(VIII)

Further, it is also possible to use any of a very wide variety of epoxides having a β-hydroxy ether group, prepared by the reaction of (poly)epoxides with a substoichiometric amount of monofunctional nucleophiles such as carboxylic acids, phenols, thiols or secondary amines.

The free primary or secondary OH functionality of the monohydroxyl epoxide compound of the formula (IV) permits efficient reaction with terminal isocyanate groups of prepolymers, without the need to use disproportionately large excesses of the epoxide component for this purpose.

For the reaction of the polyurethane prepolymers PU1 of the formula (V) it is possible to use stoichiometric amounts of monohydroxyl epoxide compound of the formula (IV) or mixtures thereof. It is possible to deviate from the stoichiometry in respect of its equivalents of OH groups or isocyanate groups, respectively. The [OH]/[NCO] ratio is 0.6 to 3.0, preferably 0.9 to 1.5, more particularly 0.98 to 1.1.

The polymer B is advantageously elastic in character and, furthermore, is advantageously soluble or dispersible in liquid epoxy resins.

The weight fraction of all the polymers B of the formula (I) is preferably between 5% and 40% preferably between 7% and 35%, by weight, based on the weight of the overall composition.

If required, and depending on the resulting viscosity the polymer B can be diluted with further epoxy resins. Preferred for this purpose are diglycidyl ethers of bisphenol A, bisphenol F and also of bisphenol A/F, and also the reactive diluents F described below, which carry epoxide groups, more particularly hexanediol diglycidyl ether, polypropylene glycol diglycidyl ether, and trimethylol propane triglycidyl ether.

The composition further comprises at least one thixotropic agent C based on a urea derivative. The urea derivative is more particularly a reaction product of an aromatic monomeric diisocyanate with an aliphatic amine compound. It is also quite possible to react to a more different monomeric diisolarly a phthalate or an adipate, preferably a diisodecylphthalate (DIDP) or dioctyladipate (DOA). The carrier agent may also be a nondiffusing carrier agent. This is preferred in order to ensure minimal migration of unreacted constituents after curing. Preference as nondiffusing carrier agents is given to blocked polyurethane prepolymers.

The preparation of such preferred urea derivatives and carrier materials is described in detail in patent application EP 1 152 019 A1. The carrier material is advantageously a blocked polyurethane prepolymer PU2, obtained more particularly by reaction of a trifunctional polyether polyol with IPDI and subsequent blocking of the terminal isocyanate groups with caprolactam.

The total fraction of the thixotropic agent C is advantageously 5%-40%, preferably 10%-25%, by weight, based on the weight of the overall composition.

The ratio of the weight of the urea derivative to the weight of any carrier agent present is preferably 2/98 to 50/50, more particularly 5/95-25/75.

The composition of the invention further comprises at least one curative D for epoxy resins which is activated by elevated temperature. This is preferably a curative selected from the group of dicyandiamide, guanamines, guanadines, aminoguanadines, and derivatives thereof. Further possibilities are catalytically active substituted ureas such as 3-chloro-4-methylphenylurea (chlortoluron), or phenyl-dimethylureas, more particularly p-chlorophenyl-N,N-dimethylurea (monuron), 3-phenyl-1,1-dimethylurea (fenuron) or 3,4-dichlorophenyl-N,N-dimethylurea (diuron). It is further possible to use compounds from the class of the imidazoles and amine complexes. Dicyandiamide is particularly preferred.

The total fraction of the curative D is advantageously 1%-10%, preferably 2%-8% by weight, based on the weight of the overall composition.

In one preferred embodiment the composition further comprises at least one liquid epoxy resin E. Preferred liquid epoxy resins E have the formula (III)

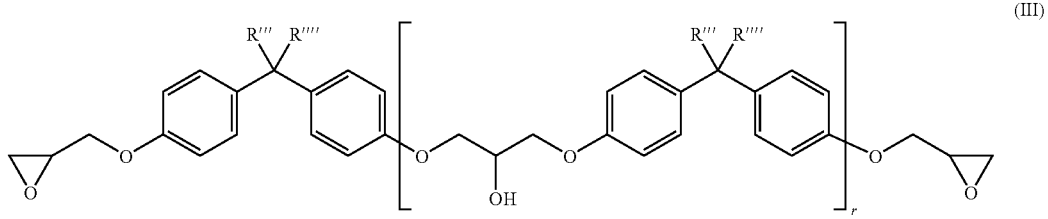

(III)

In this formula the substituents R''' and R'''' independently of one another are either H or CH$_3$. Furthermore, the index r is a value of 0-1. Preferably r is a value of less than 0.2.

The resins in question are therefore preferably diglycidyl ethers of bisphenol A (DGEBA), of bisphenol F, and also of bisphenol A/F (the designation 'A/F' refers here to a mixture of acetone with formaldehyde which is used as a reactant in its preparation). Liquid resins of this kind are available, for example, as Araldite® GY 250, Araldite® PY 304, Araldite® GY 282 (Huntsman) or D.E.R 331 (Dow) or Epikote 828 (Resolution).

The composition preferably contains a total fraction of liquid epoxy resin E of 10%-70%, more particularly 15%-60%, by weight, based on the weight of the overall composition.

In one further-preferred embodiment, the composition further comprises at least one filler F. Fillers in question here are preferably mica, talc, kaolin, wollastonite, feldspar, chlorite, bentonite, montmorillonite, calcium carbonate (precipitated or ground), dolomite, quartz, silicas (fumed or precipitated), cristobalite, calcium oxide, aluminum hydroxide, magnesium oxide, hollow ceramic beads, hollow glass beads, hollow organic beads, glass beads and color pigments. Reference to filler F is not only to the organically coated forms but also to the uncoated commercially available forms and the forms known to the skilled worker.

The total fraction of the overall filler F is advantageously 3%-30%, preferably 5%-25%, by weight, based on the weight of the overall composition.

In one further preferred embodiment, the composition further comprises at least one reactive diluent G which carries epoxide groups. These reactive diluents G are more particularly:
- glycidyl ethers of monofunctional saturated or unsaturated, branched or unbranched, cyclic or open-chain C$_4$-C$_{30}$ alcohols, e.g. butanol glycidyl ether, hexanol glycidyl ether, 2-ethylhexanol ether, allyl glycidyl ether, tetrahydrofurfuryl and furfuryl glycidyl ethers, trimethoxysilyl glycidyl ether, etc.
- glycidyl ethers of difunctional saturated or unsaturated, branched or unbranched, cyclic or open-chain C$_2$-C$_{30}$ alcohols, e.g., ethylene glycol, butanediol, hexanediol, and octanediol glycidyl ethers, cyclohexanedimethanol diglycidyl ether, neopentyl glycol diglycidyl ether, etc.
- glycidyl ethers of trifunctional or poly-functional, saturated or unsaturated, branched or unbranched, cyclic or open-chain alcohols such as epoxidized castor oil, epoxidized trimethylolpropane, epoxidized pentaerythritol or polyglycidyl ethers of aliphatic polyols such as sorbitol, glycerol, trimethylolpropane, etc.
- glycidyl ethers of phenol compounds and aniline compounds, such as phenyl glycidyl ether, cresol glycidyl ether, p-tert-butylphenyl glycidyl ether, nonylphenol glycidyl ether, 3-n-pentadecenyl glycidyl ether (from cashew nut shell oil), N,N-diglycidylaniline, etc.
- epoxidized tertiary amines such as N,N-diglycidylcyclohexylamine, etc.
- epoxidized monocarboxylic or dicarboxylic acids such as glycidyl neodecanoate, glycidyl methacrylate, glycidyl benzoate, diglycidyl phthalate, tetrahydrophthalate, and hexahydrophthalate, diglycidyl esters of dimeric fatty acids, etc.
- epoxidized difunctional or trifunctional polyether polyols of low to high molecular mass, such as polyethylene glycol diglycidyl ether, polypropylene glycol diglycidyl ether, etc.

Particular preference is given to hexanediol diglycidyl ether, polypropylene glycol diglycidyl ether and polyethylene glycol diglycidyl ether.

The total fraction of the reactive diluent G carrying epoxide groups is advantageously 1%-7%, preferably 2%-6%, by weight, based on the weight of the overall composition.

The composition may comprise further ingredients, more particularly catalysts, heat stabilizers and/or light stabilizers, thixotropic agents, plasticizers, solvents, dyes and pigments.

It has proven particularly advantageous that even with compositions which contain no epoxide adducts, of the kind known from the prior art EP-A-1 359 202, EP-A-1 431 325 or EP-A-1 498 441, it is possible to obtain these kind of good impact resistances.

It has emerged that the compositions of the invention are especially suitable as one-component adhesives. A one-component adhesive of this kind has broad possibilities for use. In particular, it is possible therewith to realize thermosetting one-component adhesives which are distinguished by a high impact resistance not only at relatively high temperatures but also, in particular, at low temperatures, more particularly between 0° C. to −40° C. Such adhesives are required for the bonding of heat-stable materials. By heat-stable materials are meant materials which are dimensionally stable, at least during the cure time, at a curing temperature of 100-220° C., preferably 120-200° C. These materials are more particularly metals and plastics such as ABS, polyamide, polyphenylene ether, composite materials such as SMC, unsaturated polyester GRP, composite epoxide materials or composite acrylate materials. Preference is given to the application wherein at least one material is a metal. A particularly preferred use is the adhesive bonding of like or different materials, more particularly in bodyshell construction in the automobile industry. The preferred metals are principally steel, more particularly electrolytically galvanized, hot-dip galvanized, and oiled steel, Bonazinc-coated steel, and retrospectively phosphated steel, and also aluminum, more particularly in the versions typically found in automaking.

In principle, two component adhesives are also conceivable.

With an adhesive based on a composition of the invention it is possible to achieve the desired combination of high crash strength and both high and low service temperature.

An adhesive of this kind is first contacted with the materials to be bonded at a temperature of between 10° C. and 80° C., more particularly between 10° C. and 60° C., and subsequently cured at a temperature of typically 100-220° C., preferably 120-200° C.

With a composition of the invention it is of course also possible, as well as thermosetting adhesives, to realize sealants or coatings. Furthermore, the compositions of the invention are suitable not only for automobile construction but also for other fields of application. Particular mention may be given to related applications in the construction of means of transport such as boats, trucks, buses or rail vehicles, or in the construction of consumer goods such as washing machines, for example.

The materials bonded by means of a composition of the invention are employed at temperatures between typically 100° C. and −40° C., preferably between 80° C. and −40° C., more particularly between 50° C. and −40° C. Compositions can be formulated which typically have fracture energies, measured in accordance with DIN 11343, of more than 10.0 J at 23° C. and more than 5.0 J at −40° C. In some instances it is possible to formulate compositions which have fracture energies of more than 11.0 J at 23° C. and of more than 7.0 J at −40° C. Particularly advantageous compositions even have fracture energies of more than 15.0 J at 23° C. and of more than 13.0 J at −40° C.

More particularly it is also possible for the fracture energies at −40° C. to be not very much lower than at room temperatures. For instance, ratios of the fracture energy at −40° C. to the fracture energy at 23° C. of ≧0.40, more particularly ≧0.50, are possible. The particularly preferred compositions attain ratios of ≧0.70, or even of ≧0.80.

In a specific way it is also possible to realize hotmelt adhesives on the basis of the composition of the invention. In this case, additionally, the hydroxyl groups that form in the solid epoxy resin A are reacted with polyisocyanate, or with a polyisocyanate prepolymer. This increases the viscosity, and necessitates hot application.

EXAMPLES

Highlighted below are a number of examples which further illustrate the invention but are in no way intended to restrict the scope of the invention. The base materials used in the examples are listed in Table 1.

TABLE 1

Base materials employed

| Base materials used | Supplier |
| --- | --- |
| Bisphenol A diglycidyl ether (=DGEBA) | Huntsman |
| Araldite GT 7071 (solid resin) (EP equivalent weight about 515 g/EP equivalent) | Huntsman |
| Dicyandiamide (=Dicy) | Degussa |
| Isophorone diisocyanate (=IPDI) | Degussa-Hüls |
| Caprolactam | EMS Chemie |
| N-Butylamine | BASF |
| 4,4'-Diphenylmethylene diisocyanate (=MDI) | Bayer |
| Hexanediol diglycidyl ether | Prümmer |
| Alcupol ® D-2021 (difunctional polypropylene glycol) (OH equivalent weight = 1000 g/OH equivalent | Repsol |
| Desmophen 3060 BS (trifunctional polypropylene glycol) OH equivalent weight = 1000 g/OH equivalent | Bayer |
| PolyTHF 1800 (difunctional polybutylene glycol) (OH equivalent weight = 900 g/OH equivalent | BASF |
| PolyTHF 2000 (difunctional polybutylene glycol) (OH equivalent weight = 1000 g/OH equivalent | BASF |
| Poly bd ® R45 HTLO (hydroxyl-terminated polybutadiene) (OH equivalent weight = about 1200 g/OH equivalent | Arkema |
| 4,4'-[Bis(hydroxyphenyl)-1,3-phenylenebis(1-methylethylidene)] (=bisphenol M) | Mitsui Chemicals |

Exemplary Preparation of a Monohydroxyl-containing Epoxide "MHE"

Trimethylolpropane glycidyl ether was prepared in accordance with the method in patent U.S. Pat. No. 5,668,227, example 1, from trimethylolpropane and epichlorohydrin, using tetramethylammonium chloride and aqueous sodium hydroxide solution. This gives a yellowish product having an epoxide number of 7.5 eq/kg and a hydroxyl group content of 1.8 eq/kg. From the HPLC-MS spectrum it can be concluded that what is present is essentially a mixture of trimethylolpropane diglycidyl ether and trimethylolpropane triglycidyl ether.

Preparation of Polymer B

Example B-01

80 g of PolyTHF 1800 (OH number 62.3 mg/g KOH), 55 g of Poly-bd® R-45HTLO (OH number 46.6 mg/g KOH), and 65 g of Alcupol D2021 (OH number 56.0 mg/g KOH) were dried under reduced pressure at 100° C. for 30 minutes. Subsequently 46.2 g of IPDI and 0.04 g of dibutyltin dilaurate were added. The reaction was carried out under reduced pressure at 90° C. until the NCO content was constant at 3.44% after 2.5 h (theoretical NCO content: 3.6%). Subsequently 117.6 g of the above-described trimethylolpropane glycidyl ether were added as monohydroxyl-containing epoxide of the formula (IV). Stirring was continued under reduced pressure at 90° C. until, after a further 3 h, the NCO content had dropped below 0.1%. This gave a clear product having an epoxide content ("final EP content") of 2.47 eq/kg.

Preparation of Polymer B

Example B-02

200 g of PolyTHF 2000 (OH number 57.5 mg/g KOH) were dried under reduced pressure at 100° C. for 30 minutes. Subsequently 47.5 g of IPDI and 0.04 g of dibutyltin dilaurate were added. The reaction was carried out under reduced pressure at 90° C. until the NCO content was constant at 3.58% after 2.5 h (theoretical NCO content: 3.70%). Subsequently 118.0 g of the above-described trimethylolpropane glycidyl ether were added as monohydroxyl-containing epoxide of the formula (IV). Stirring was continued under reduced pressure at 90° C. until, after a further 3 h, the NCO content had dropped below 0.1%. This gave a clear product having an epoxide content ("final EP content") of 2.50 eq/kg.

Preparation of Polymer B

Example B-03

200 g of PolyTHF 2000 (OH number 57.5 mg/g KOH) were dried under reduced pressure at 100° C. for 30 minutes. Subsequently 47.5 g of IPDI and 0.04 g of dibutyltin dilaurate were added. After 2.5 h of reaction at 90° C. under reduced pressure, 17.7 g of bisphenol M were added. The reaction was carried out for a further 2.0 h under reduced pressure at 90° C. until the NCO content was constant at 1.99% (theoretical NCO content: 2.03%). Subsequently 72.6 g of the above-described trimethylolpropane glycidyl ether were added as monohydroxyl-containing epoxide of the formula (IV). Stirring was continued under reduced pressure at 90° C. until, after a further 3 h, the NCO content had dropped below 0.1%. This gave a clear product having an epoxide content ("final EP content") of 1.60 eq/kg.

Thixotropic Agent C

As an example of a thixotropic agent C based on a urea derivative in a nondiffusing carrier material, a thixotropic agent C was prepared in accordance with patent application EP 1 152 019 A1 in a blocked polyurethane prepolymer, with base materials mentioned above:

Carrier Material: Blocked Polyurethane Prepolymer "Block-PUP"

600.0 g of a polyether polyol (desmophen 3060BS; 3000 daltons; OH number 57 mg/g KOH) were reacted under reduced pressure and with stirring at 90° C. with 140.0 g of IPDI and 0.10 g of dibutyltin dilaurate to give the isocyanate-terminated prepolymer. The reaction was carried out until after 2.5 h the NCO content was constant at 3.41% (theoretical NCO content: 3.60%). Subsequently the free isocyanate groups were blocked under reduced pressure at 90° C. with 69.2 g of caprolactam (2% excess), giving an NCO content of <0.1% after 3 h.

Urea Derivative ("HSD") in Blocked Polyurethane Prepolymer:

Under nitrogen and with gentle heating, 68.7 g of MDI flakes were melted in 181.3 g of the above-described blocked prepolymer "BlockPUP". Thereafter, over two hours under nitrogen and with rapid stirring, 40.1 g of N-butylamine, in solution in 219.9 g of the above-described blocked prepolymer "BlockPUP", were added dropwise. After the end of the addition of the amine solution, the white paste was stirred for a further 30 minutes. This gave, after cooling, a soft, white paste which had a free isocyanate content of <0.1% (fraction of urea derivative about 21%).

Preparation of the Compositions

In accordance with Table 2 the reference compositions Ref.1-Ref. 5 and also the inventive compositions Z-01, Z-02 and Z-03 were prepared. Since some of the terminal isocyanates in B-03 were blocked with bisphenol M and not consumed by reaction with monohydroxyl-containing epoxide, this led to a lower final EP content than in the polymers B-01 and B-02. In the formulation comprising the polymer B-03, therefore, the "missing" amount of monohydroxyl-containing epoxide of the formula (IV) in comparison to B-01 and B-02, previously described as MHE, was added in addition. For the same reason, the above-described MHE was added to the reference compositions Ref.2 and Ref.3, which instead of polymer B contain a blocked prepolymer "BlockPUP".

Test Methods:
Tensile Shear Strength (TSS) (DIN EN 14.65)

The specimens were produced from the above-described example compositions and using electrolytically galvanized steel (eloZn) measuring 100×25×0.8 mm, the bond area being 25×10 mm with a layer thickness of 0.3 mm. Curing was carried out at 180° C. for 30 minutes. The pulling speed was 10 mm/min.

Impact Peel Energy (ISO 11343)

The specimens were produced from the above-described example compositions and using electrolytically galvanized steel (eloZn) measuring 90×20×0.8 mm, the bond area being 20×30 mm with a layer thickness of 0.3 mm. Curing was carried out at 180° C. for 30 minutes. The pulling speed was 2 m/s. The figure reported as the fracture energy, in joules is the area beneath the measurement curve (from 25% to 90%, in accordance with DIN 11343).

The results from Table 2 show the advantageous properties of the compositions of the invention in comparison to the reference examples.

The invention claimed is:

1. A composition comprising:
(A) at least one solid epoxy resin of the formula (II)

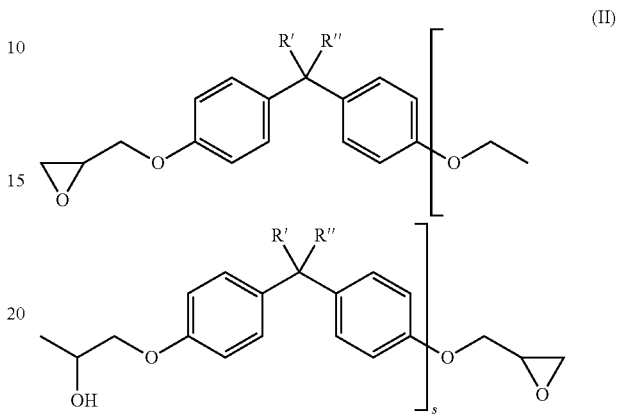

where
the substituents R' and R" independently of one another are either H or $CH_3$; and
the index s is a value >1.5;
(B) at least one polymer of the formula (I)

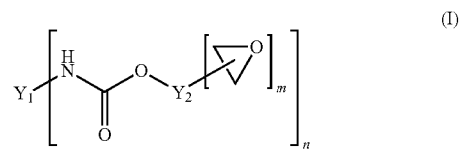

where
the at least one polymer of formula (I) is the reaction product of:
a linear or branched polyurethane prepolymer PU1 terminated with n isocyanate groups and

TABLE 2

Compositions and Properties.

| | Ref. 1 | Ref. 2 | Ref. 3 | Ref. 4 | Ref. 5 | Z1 | Z2 | Z3 |
|---|---|---|---|---|---|---|---|---|
| Araldite GT 7071 (A) [g] | 20.0 | 20.0 | | | 20.0 | 20.0 | 20.0 | 20.0 |
| B-01 (B) [g] | | | | 30.0 | 30.0 | 30.0 | | |
| B-02 (B) [g] | | | | | | | 30.0 | |
| B-03 (B) [g] | | | | | | | | 30.0 |
| HSD [g] | | 4.3 | 4.3 | 4.3 | | 4.3 | 4.3 | 4.3 |
| BlockPUP [g] | 15.7 | 35.7 | 35.7 | 15.7 | 15.7 | 15.7 | 15.7 | 15.7 |
| Dicyanamide (D) [g] | 3.9 | 5.1 | 5.1 | 5.1 | 5.1 | 5.1 | 5.1 | 5.1 |
| DGEBA (E) [g] | 36.0 | 36.0 | 43.0 | 43.0 | 36.0 | 36.0 | 36.0 | 36.0 |
| Filler mixture (F) [g] | 13.0 | 13.0 | 13.0 | 13.0 | 13.0 | 13.0 | 13.0 | 13.0 |
| Hexanediol diglycidyl ether (G) [g] | 3.0 | 3.0 | 3.0 | 3.0 | 3.0 | 3.0 | 3.0 | 3.0 |
| Trimethylolpropane glycidyl ether MHE [g] | | 10.0 | 10.0 | | | | | 3.5 |
| TSS [MPa] | 24.3 | 23.6 | 20.1 | 20.1 | 24.0 | 23.6 | 24.1 | 22.6 |
| FE[1] at 50° C. [J] | 15.1 | 13.5 | 10.0 | 9.6 | 10.3 | 15.0 | 15.2 | 14.8 |
| FE[1] at 23° C. [J] | 13.4 | 12.2 | 9.4 | 9.6 | 10.6 | 14.3 | 15.9 | 15.2 |
| FE[1] at −20° C. [J] | 3.7 | 2.7 | 6.3 | 9.2 | 3.3 | 13.1 | 12.4 | 13.8 |
| FE[1] at −40° C. [J] | 0.8 | 1.6 | 0.6 | 8.7 | 1.7 | 7.3 | 11.2 | 13.0 |

FE[1] = Fracture energy a monohydroxyl epoxide compound having m epoxy groups and a single primary or secondary hydroxyl group;

$Y_1$ is the structural portion of the polyurethane prepolymer PU1, excluding the isocyanate groups;

$Y_2$ is the structural portion of the monohydroxyl epoxy compound, excluding the epoxy groups and the primary or secondary hydroxyl group, wherein $Y_2$ is structurally aliphatic, cycloaliphatic, aromatic or araliphatic;

m is 1, 2 or 3; and n is 2 to 8;

(C) at least one thixotropic agent based on a urea derivative; and (D) at least one curative for epoxy resins which is activated by elevated temperature.

2. The composition of claim 1, wherein component (A) is present in an amount of 1% to 40% by weight, based on the weight of the overall composition.

3. The composition of claim 1, wherein component (B) is elastic.

4. The composition of claim 1, wherein component (B) is soluble or dispersible in liquid epoxy resins.

5. The composition of claim 1, wherein the polyurethane prepolymer PU1 is prepared from:
at least one diisocyanate or triisocyanate; and
at least one of a polymer $Q_{PM}$ having terminal amino, thiol or hydroxyl groups and an optionally substituted polyphenol $Q_{PP}$.

6. The composition of claim 5, wherein the polymer $Q_{PM}$ has 2 or 3 terminal amino, thiol or hydroxyl groups.

7. The composition of claim 5, wherein the polyphenol $Q_{PP}$ has 2 or 3 phenolic groups.

8. The composition of claim 5, wherein the polymer $Q_{PM}$ is an α,ω-polyalkylene glycol having $C_2$-$C_6$ alkylene groups or having mixed $C_2$-$C_6$ alkylene groups and terminated with amino groups, thiol groups or hydroxyl groups.

9. The composition of claim 5, wherein the polymer $Q_{PM}$ is a hydroxyl-containing polybutadiene, a hydroxyl-containing polyisoprene or their hydrogenated reaction products.

10. The composition of claim 5, wherein the polymer $Q_{PM}$ has an OH equivalent weight of 600-6000 g/OH equivalent.

11. The composition of claim 5, wherein the polyurethane prepolymer PU1 is prepared from:
a diisocyanate; and
at least one of a polymer $Q_{PM}$ having terminal amino, thiol or hydroxyl groups and an optionally substituted polyphenol $Q_{PP}$.

12. The composition of claim 1, wherein component (B) is present in an amount of 5% and 40% by weight, based on the weight of the overall composition.

13. The composition of claim 1, wherein component (C) is present in a carrier agent.

14. The composition of claim 13, wherein the carrier agent is a nondiffusing carrier agent.

15. The composition of claim 13, wherein the carrier agent is a plasticizer.

16. The composition of claim 13, wherein the weight ratio of the urea derivative of component (C) to the carrier agent is 2/98 to 50/50.

17. The composition of claim 1, wherein the urea derivative of component (C) is the reaction product of an aromatic monomeric diisocyanate and an aliphatic amine compound.

18. The composition of claim 1, wherein component (C) is present in an amount of 5% to 40% by weight, based on the weight of the overall composition.

19. The composition of claim 1, wherein component (D) is a latent curative selected from the group consisting of dicyandiamide, guanamines, guanadines, and aminoguanadines.

20. The composition of claim 1, wherein component (D) is present in an amount of 1% to 10% by weight, based on the weight of the overall composition.

21. The composition of claim 1, wherein the composition further comprises (E) at least one liquid epoxy resin.

22. The composition of claim 21, wherein component (E) has the formula (III)

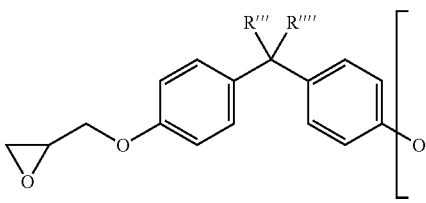 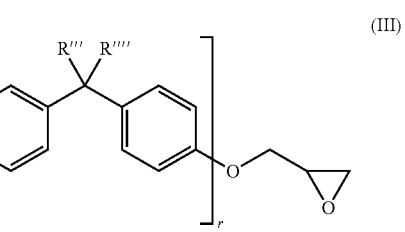

(III)

where
the substituents R''' and R'''' independently of one another are either H or $CH_3$; and
the index r is a value of 0-1.

23. The composition of claim 21, wherein component (E) is present in an amount of 10% to 70% by weight, based on the weight of the overall composition.

24. The composition of claim 1, wherein the composition further comprises (F) at least one filler, wherein component (F) is present in an amount of 5% to 30% by weight, based on the weight of the overall composition.

25. The composition of claim 1, wherein the composition further comprises (G) at least one reactive diluent having epoxide groups.

26. The composition of claim 1, wherein the composition after curing has a fracture energy, measured in accordance with DIN 11343, of more than 10 J at 23° C.

27. The composition of claim 26, wherein the composition after curing has a fracture energy of more than 5 J at −40° C., and wherein the ratio of the fracture energy at −40° C. to the fracture energy at 23° C. is greater than or equal to 0.40.

28. A method of adhesively bonding heat-stable materials comprising: contacting the heat-stable materials with the composition of claim 1; and curing the composition at a temperature of 100 to 220° C.

29. The method of adhesive bonding of claim 28, wherein the heat-stable materials are contacted with the composition at temperatures between −40° C. and 100° C.

* * * * *